(12) United States Patent
Mitaritonna et al.

(10) Patent No.: US 9,404,387 B2
(45) Date of Patent: Aug. 2, 2016

(54) HONEYCOMB SEAL AND METHOD

(71) Applicant: Nuovo Pignone S.P.A., Florence (IT)

(72) Inventors: Nicola Mitaritonna, Florence (IT); Giuseppe Vannini, Montecatinito (IT)

(73) Assignee: NUOVO PIGNONE S.P.A., Florence (IT)

( * ) Notice: Subject to any disclaimer, the term of this patent is extended or adjusted under 35 U.S.C. 154(b) by 627 days.

(21) Appl. No.: 13/722,973

(22) Filed: Dec. 20, 2012

(65) Prior Publication Data
US 2013/0156553 A1   Jun. 20, 2013

(30) Foreign Application Priority Data

Dec. 20, 2011 (IT) .............................. CO2011A0068

(51) Int. Cl.
| | |
|---|---|
| *F01D 5/20* | (2006.01) |
| *F01D 25/00* | (2006.01) |
| *F01D 11/12* | (2006.01) |
| *F04D 29/10* | (2006.01) |
| *F16J 15/44* | (2006.01) |
| *F04D 29/16* | (2006.01) |

(52) U.S. Cl.
CPC .............. *F01D 25/00* (2013.01); *F01D 11/127* (2013.01); *F04D 29/102* (2013.01); *F04D 29/164* (2013.01); *F16J 15/444* (2013.01); *F05D 2240/125* (2013.01); *F05D 2240/55* (2013.01); *F05D 2250/283* (2013.01); *Y10T 29/49826* (2015.01)

(58) Field of Classification Search
CPC ....... F16J 15/00; F16J 15/444; F16J 15/3272; F16J 15/54; F01D 11/08; F01D 11/12; F01D 11/127; F01D 11/00

USPC ................................. 415/173.7, 170.1, 173.1
See application file for complete search history.

(56) References Cited

U.S. PATENT DOCUMENTS

| | | | |
|---|---|---|---|
| 4,162,077 A | | 7/1979 | Crow et al. |
| 4,545,586 A | * | 10/1985 | von Pragenau ............... 277/414 |
| 4,623,298 A | * | 11/1986 | Hallinger et al. .............. 415/139 |
| 5,540,447 A | | 7/1996 | Shultz et al. |
| 6,251,494 B1 | * | 6/2001 | Schreiber ....................... 428/116 |
| 2006/0237914 A1 | * | 10/2006 | Li et al. ......................... 277/415 |
| 2007/0025444 A1 | | 2/2007 | Okada et al. |
| 2007/0257444 A1 | | 11/2007 | Childs |

FOREIGN PATENT DOCUMENTS

CN         2405012 Y        11/2000

OTHER PUBLICATIONS

Dresser-Rand Company, Swirl Brakes, 2003, Dresser-Rand—Internet Publishing, www.enginuityinc.com/literature/services/2035-SwirlBrake.pdf, p. 1.*

Nielsen K K et alL "Experimental and Theoretical Comparison of Two Swirl Brake Designs", Apr. 1, 2001, pp. 353-358, XP007919180.

(Continued)

*Primary Examiner* — Dwayne J White
*Assistant Examiner* — Jason Mikus
(74) *Attorney, Agent, or Firm* — GE Global Patent Operation; Marc A. Vivenzio

(57) ABSTRACT

A seal for a turbo machine is provided. The seal includes a plurality of honeycomb cells, at least one circumferential groove within the plurality of honeycomb cells, and at least one swirl brake within the at least one groove.

10 Claims, 6 Drawing Sheets

(56) References Cited

OTHER PUBLICATIONS

Search Report and Written Opinion from corresponding IT Application No. CO20110068, dated Aug. 16, 2012.

Childs et al., "A Design to Increase the Static Stiffness of Hole Pattern Stator Gas Seals", ASME Turbo Expo 2006: Power for Land, Sea and Air, pp. 1-6, May 8-11, 2006.

* cited by examiner

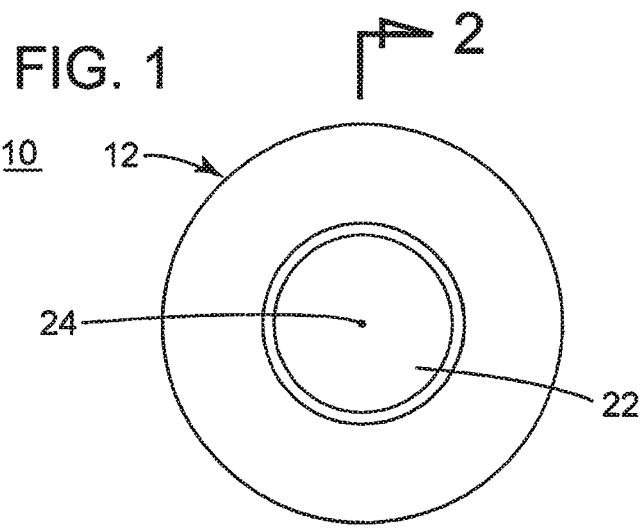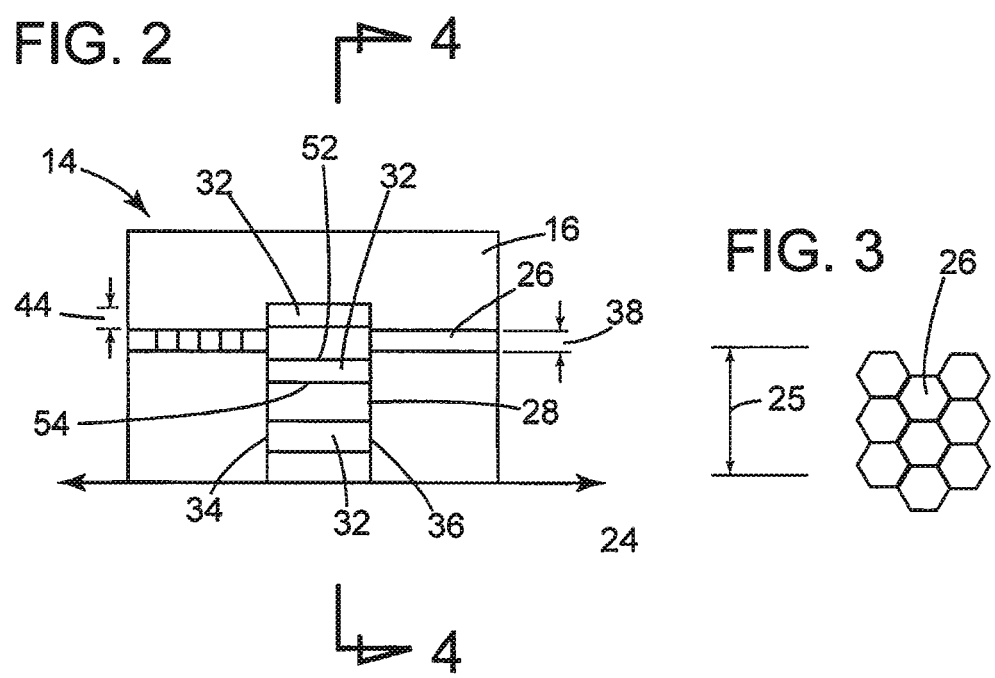

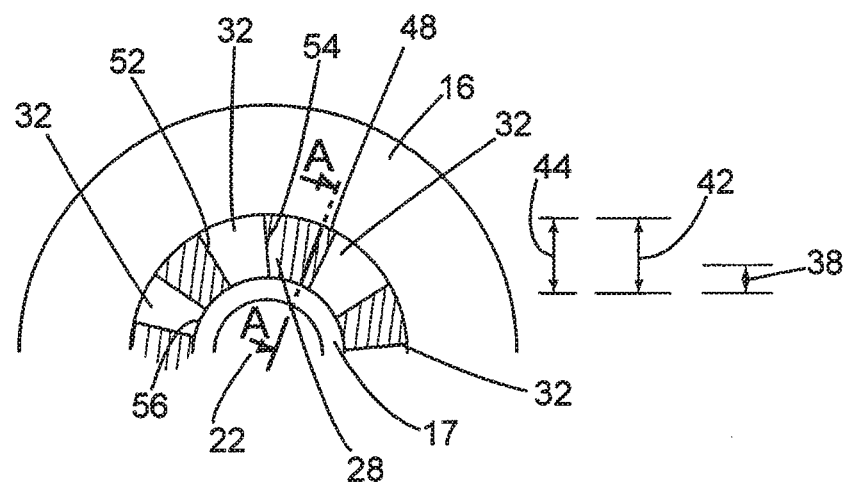
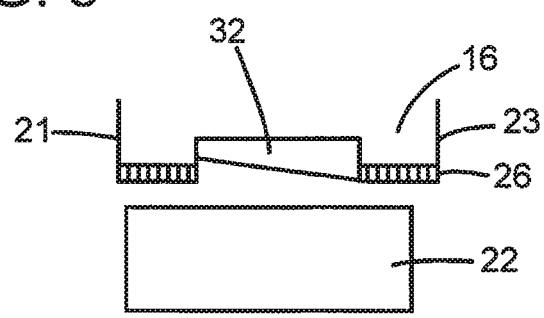

HONEYCOMB SEAL AND METHOD

BACKGROUND OF THE INVENTION

Embodiments of the present invention generally relate to seals and more particularly, to honeycomb seals for turbo machines.

A compressor is a machine which accelerates gas particles to ultimately increase the pressure of a compressible fluid, for example, a process gas, through the use of mechanical energy. Compressors are commonly used in the energy industry to produce, process, re-inject and transport many different types of gases. Among the various types of compressors are the so-called centrifugal compressors, in which a rotor mounted impeller imparts a centrifugal acceleration to a process gas. More generally, centrifugal compressors can be said to be part of a class of machinery known as "turbo machines" or "turbo rotating machines".

High speed rotating centrifugal compressors may be prone to rotor-dynamic instability. The compressor seals are the major source of destabilizing forces responsible for instability. This is particularly true in applications involving high pressure high density gas, such as natural gas reinjection. Consequently, a seal or seals may be responsible for preventing full speed, full load compressor operation. In more severe cases, rotor destabilizing forces introduced to the rotating assembly by a seal or seals may cause a catastrophic failure necessitating costly shut down and repair.

Some seals, such as honeycomb seals, are known for providing not only a relatively low maintenance sealing solution, but also for providing a damping effect which may counteract such destabilizing forces. Honeycomb seals are thus often implemented in centrifugal compressor applications to enhance rotor-dynamic stability.

As shown in FIG. 11, a honeycomb seal 514 may include a seal body 516 having a plurality of honeycomb cells 518. During operation, the honeycomb cells resist the flow of fluid through a seal gap between the seal body and the rotor to provide both a sealing function and a rotor stabilizing function. Unfortunately, under certain circumstances and in certain configurations, it has been found that the honeycomb seal may actually add an undesired negative stiffness and a destabilizing effect (cross coupled stiffness) to the rotor assembly. One solution proposed for addressing this effect has been to add a groove, such as groove 522 in FIG. 11, to "break up" the honeycomb seal and thereby inhibit the destabilizing direct negative stiffness effect. For a further discussion of the addition of a groove in a honeycomb seal, see for example, Childs et al., *A Design to Increase the Static Stiffness of Hole Pattern Stator Gas Seals*, ASME Turbo Expo 2006; Power for Land, Sea and Air May 8-11, 2006, GT2006-90778, the entirety of which is herein incorporated by reference.

It is also generally understood that fluid swirl introduced to process fluids by the rotation of the rotor shaft may play a role in the onset of cross coupling. To inhibit swirl, it has been proposed to add a vane or vanes to the compressor casing to direct process fluid opposite to the direction of swirl. It has also been proposed to add another seal to the rotor shaft to reduce swirl, see for example U.S. Pat. No. 5,540,447, issued on Jul. 30, 1996 to Shultz et al., the entirety of which is herein incorporated by reference.

The addition of a vane or vanes and/or yet another extra seal to the turbo rotor shaft results in further complexity and additional rotating mass, both of which are undesirable in the drive to improve compressor performance. What is needed is a seal for a turbo machine capable of providing improved sealing, improved stabilization, reduced cross coupling, and improved turbo machine performance.

BRIEF DESCRIPTION OF THE INVENTION

According to an embodiment of the present invention, a seal for a turbo machine is provided. The seal comprises a plurality of honeycomb cells, at least one circumferential groove within the plurality of honeycomb cells, and at least one swirl brake within the at least one groove.

According to another embodiment of the present invention, a turbo machine is provided. The turbo machine comprises a turbo machine stator, a turbo machine rotor rotatable relative to the turbo machine stator, and a seal between the turbo machine stator and the turbo machine rotor, wherein the seal includes a plurality of honeycomb cells, a groove within the plurality of honeycomb cells, and at least one swirl brake within the groove.

According to another embodiment of the present invention a method for manufacturing a seal for a turbo machine is provided. The method comprises forming a groove in a seal body, forming a plurality of honeycomb cells in the seal body, and providing at least one swirl brake within the groove.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 shows an exemplary embodiment of the present invention;

FIG. 2 is a partial cross-sectional view of the exemplary embodiment shown in FIG. 1 taken along the line 2-2 in FIG. 1;

FIG. 3 depicts a plurality of honeycomb cells;

FIG. 4 is a cross-sectional view of the exemplary embodiment shown in FIG. 1 taken along the line 4-4 in FIG. 2;

FIG. 5 is a partial cross-sectional view of the exemplary embodiment shown in FIG. 4 taken along the line A-A, including a tapered swirl brake according to an embodiment of the present invention;

DETAILED DESCRIPTION OF EXEMPLARY EMBODIMENTS OF THE PRESENT INVENTION

Figure 6:
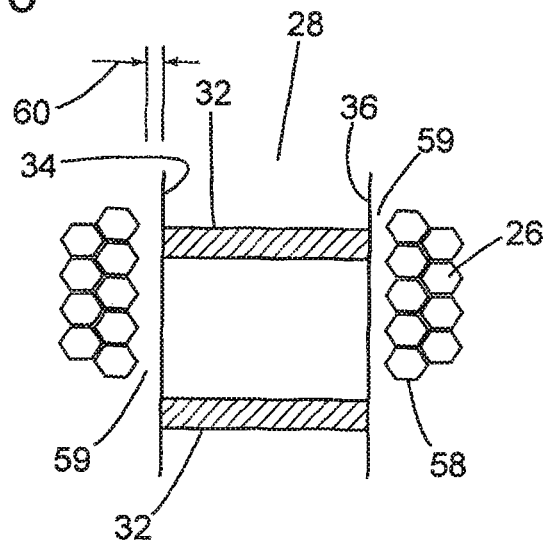
FIG. 6 depicts a groove, sidewalls, a plurality of honeycomb cells and a swirl brake of an exemplary embodiment of the present invention.

The following description of the exemplary embodiments of the present invention refers to the accompanying drawings. The same reference numerals in different drawings identify the same or similar elements. The following detailed description does not limit the invention. Instead, the scope of the invention is defined by the appended claims. The following embodiments are discussed, for simplicity, with regard to the terminology and structure of a turbo machine that has a machine stator and a machine rotor. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

FIGS. 1 to 4 show an exemplary embodiment of a honeycomb seal 14 for a turbo machine 10 according to the present invention. FIG. 1 shows a turbo machine 10 having a machine stator 12 and a machine rotor 22. As shown in FIG. 2, a honeycomb seal 14 between machine stator 12 and machine rotor 22 includes a seal body 16 extending around machine rotor 22. A gap 17 (FIG. 4) between the honeycomb cells 26 and the rotor 22 operates to provide a leakage function as well as a damping function to the rotating assembly of the compressor.

As further shown in FIG. 2, a groove 28 within the plurality of honeycomb cells 26 extends circumferentially around rotor axis 24. In the exemplary embodiment of FIGS. 1 to 4, groove 28 is provided with at least one swirl brake for resisting the circumferential motion of process gas passing axially between rotor 22 and seal body 16. As shown in FIGS. 2 and 4, the at least one swirl brake is defined by a plurality of vanes 32 within groove 28. Each vane 32 extends axially between a first side wall 34 and second side wall 36 of groove 28.

As shown in FIGS. 2 and 4, each vane 32 extends from groove floor 48 to groove top 56. The vanes 32 are uniformly distributed around the circumference of seal body 16 and have a constant thickness. In alternative embodiments (not shown), vanes 32 may be distributed in a non-uniform manner around the circumference of groove 28 and further, the thickness of each vane may also be varied individually or across all vanes 32. For example, at least one vane 32 may exhibit a taper in the radial direction between the groove floor 48 and groove top 56. Tapering may also be provided in the axial direction, for example, and as shown in FIG. 5, at least one vane 32 may taper from a downstream end 23 of seal body 16 towards the upstream end 21 of seal body 16. Alternatively, vane 32 may taper from the upstream end 21 towards the downstream end 23 of seal body 16.

According to the embodiment shown in FIGS. 2 and 4, the groove top 56, the top surface of each the plurality of honeycomb cells 28, and the top surface of each of the vanes 32 define a cylinder having a common axis and diameter thereby providing at least a portion of seal body 16 with a constant through bore. However, in other embodiments (not shown) the groove top 56, the top surface of the honeycomb cells 28 and the top surface of each of the vanes 32 may vary. For example, the top surface of the honeycomb cells 28 may define a cylinder having a different diameter from a cylinder defined by the top surface of the vanes 32. As further shown in FIGS. 2 and 4, the depth 42 of groove 28 is greater than the height 38 of honeycomb cells 26. Also, the height 44 of each vane 32 is greater than the height 38 of the honeycomb cells 26. One skilled in the art will appreciate that this configuration for groove 28, honeycomb cells 26 and vanes 32 is not a requirement of the present invention but merely an exemplary embodiment.

As further shown in FIGS. 2, 4, and 6, groove 28 is provided with a first side wall 34 and a second side wall 36 defining identical parallel circular paths around the seal body 16. As shown in FIG. 6, both side wall 34 and sidewall 36 are separated from whole honeycomb cells 58 by a margin area 59 having a constant width 60.

Figure 7:
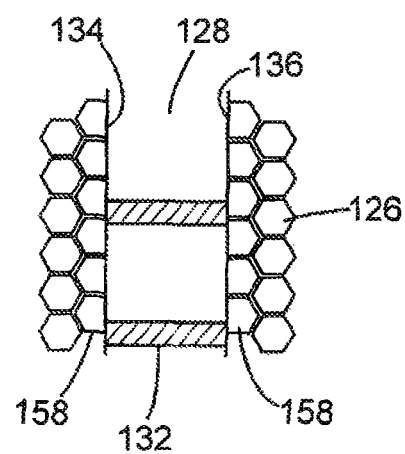
FIG. 7 depicts a groove, a plurality of honeycomb cells and a swirl brake of an exemplary embodiment of the present invention.

Alternatively, the seal body may be provided without a margin area. For example, in the exemplary embodiment shown in FIG. 7, both side wall 134 and sidewall 136 are adjacent partial honeycomb cells 158. As further shown in FIG. 7, vanes 132 may exhibit a constant thickness equal to one half the width of a honeycomb cell, i.e., one half the distance between two parallel sides of a honeycomb cell.

Figure 8:
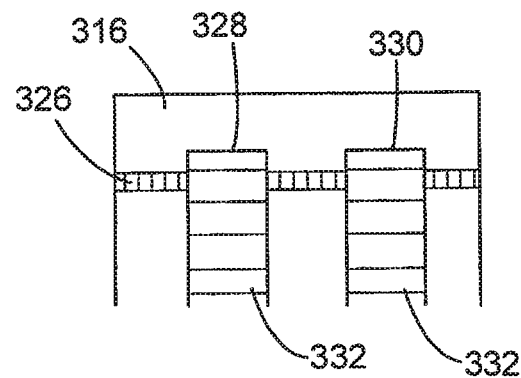
FIG. 8 shows an exemplary embodiment including multiple grooves.

FIG. 8 shows another exemplary embodiment of seal body 316. Seal body 316 includes a first groove 328 as well as a second groove 330 which are each provided within a plurality of honeycomb cells 326. First groove 328 and second groove 330 include a swirl brake in the form of a plurality of vanes 332.

As shown in FIGS. 1-8, the plurality of honeycomb cells 26, the groove 28 within the honeycomb cells 26 and the swirl brake, e.g., vanes 32, within the groove 28 may be configured to provide a sealing function, a rotor shaft stabilizing function, and a swirl inhibiting function in a seal for a turbo machine. Accordingly, seal 14 is capable of providing improved sealing, improved stabilization, reduced cross coupling, and improved turbo machine performance over conventional seals for turbo machines.

Figure 9:
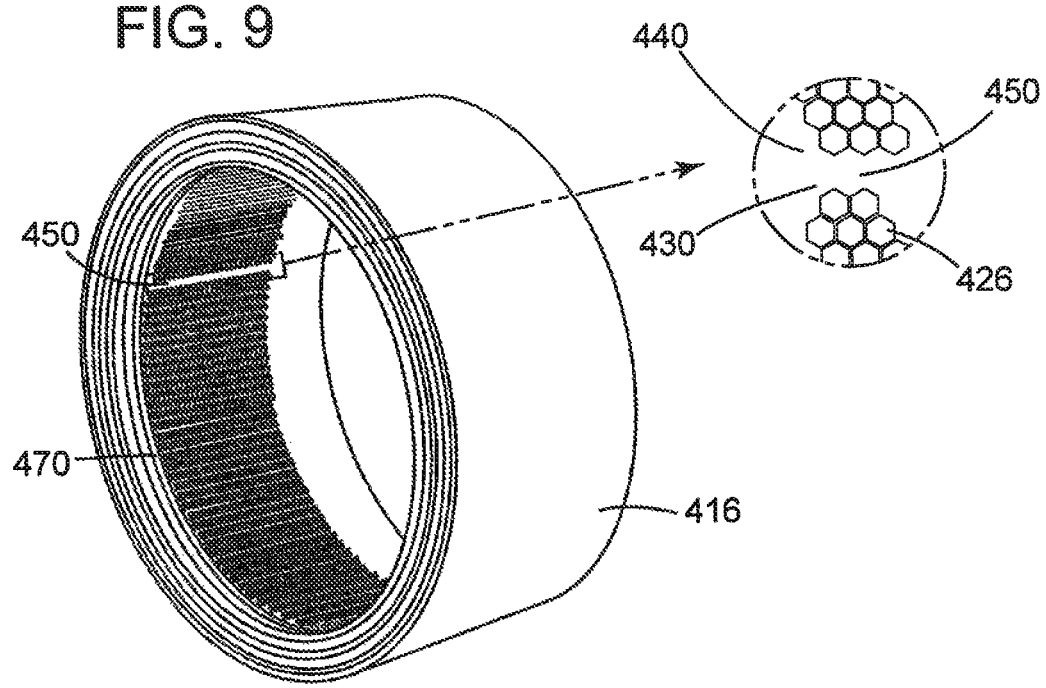
FIG. 9 shows an exemplary embodiment including honeycomb cells formed by electro-erosion machining.

FIG. 9 shows another exemplary embodiment. Seal body 416 includes a plurality of honeycomb cells 426 which may be formed by an electro erosion process. In such a process, seal body 416 may be fixed at a starting position 430 where a first row of honeycomb cells is machined into seal body 416. Seal body 416 may then be indexed to a new angular position where another row of honeycomb cells is added. This process may be continued around the circumference of seal body 416 until the ending position 440 is reached. Note that the buffer area 450 may remain at the completion of the machining process. Further note that, in the embodiment of FIG. 9, the manufacturing process is controlled so that only whole honeycomb cells 426 are formed in seal body 416.

In an exemplary method of manufacturing a seal body 416 according to the present invention, groove 28, as shown in FIG. 5 is machined into seal body 416. This machining process may be performed such that a plurality of vanes 32 is formed during the machining process. More specifically, groove 28 may be formed in sections such that the wall between each section defines a vane 32. After the groove 28 and vanes 32 are formed, the plurality of honeycomb cells 26 are machined by electro erosion, as discussed above with reference to FIG. 9, such that the margin 59 is formed between the whole honeycomb cells 26 and groove 28. Margin 59 may be configured with a width 60 equal to the width of a margin 470 provided at a periphery of the plurality of honeycomb cells 426, as shown in FIG. 9

Figure 10:
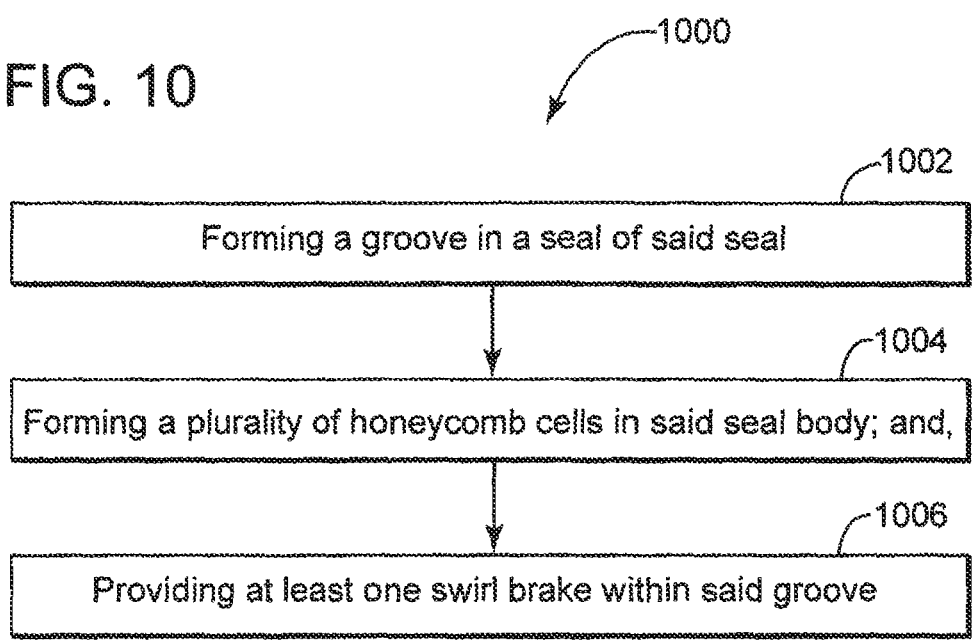
FIG. 10 is a flowchart of a method according to an embodiment of the present invention.
Figure 11:
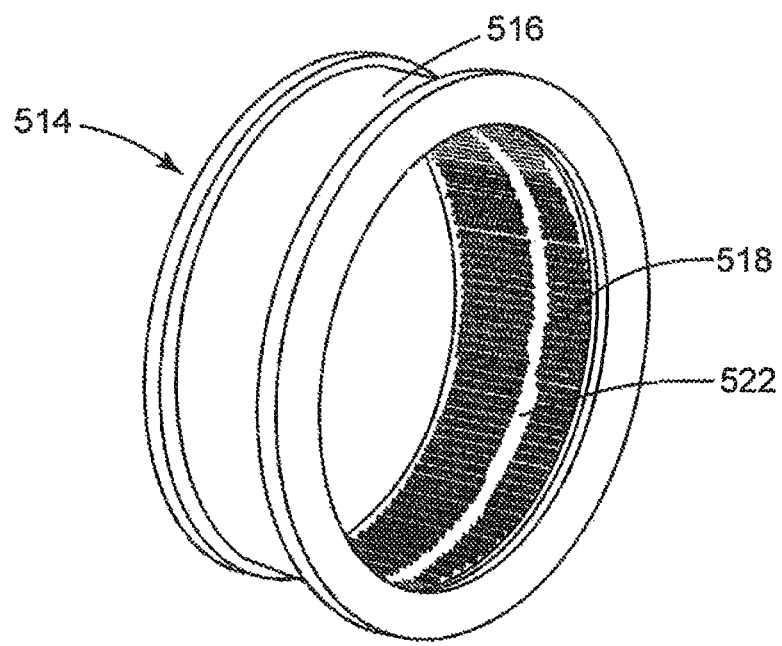
FIG. 11 depicts a honeycomb seal with a groove according to an embodiment of the present invention.

Thus, according to an embodiment as shown in the flowchart of FIG. 10, a method 1000 of manufacturing a seal for a turbo machine can include forming 1002 a groove in a seal body, forming 1004 a plurality of honeycomb cells in the seal body, and providing 1006 at least one swirl brake within the groove. These steps may be performed in any desired order or simultaneously.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A seal for a turbo machine, the seal comprising:
a plurality of honeycomb cells;
at least one circumferential groove within the plurality of honeycomb cells; and
a plurality of vanes within the at least one groove,
wherein the at least one groove has a first side wall, a second side wall, and each of the plurality of vanes extends axially between the first and second side walls of the at least one groove.

2. The seal of claim 1 wherein the plurality of honeycomb cells are spaced from the at least one groove.

3. The seal of claim 1 wherein the plurality of honeycomb cells include a plurality of partial honeycomb cells extending from the first and second side walls of the at least one groove.

4. The seal of claim 1 wherein each vane tapers in at least one of a radial direction and an axial direction.

5. The seal of claim 1 wherein each vane has a constant thickness in a direction extending from the first side wall to the second side wall of the at least one groove.

6. The seal of claim 5 wherein a top surface of the plurality of honeycomb cells defines a first cylinder and a top surface of each of the vanes define a second cylinder, wherein the first cylinder and the second cylinder are coaxial.

7. The seal of claim 6 wherein the at least one groove has a groove depth and the plurality of honeycomb cells have a cell height, and wherein the groove depth is greater than the cell height.

8. A turbo machine comprising:
a turbo machine stator;
a turbo machine rotor rotatable relative to the turbo machine stator; and
a seal between the stator and the rotor;
wherein the seal comprises a plurality of honeycomb cells, a groove within, the plurality of honeycomb cells, and a plurality of vanes within the groove, and
wherein the groove has a first side wall, a second side wall, and each of the plurality of vanes extends axially between the first and second side walls of the at least one groove.

9. A method of manufacturing a seal for a turbo machine, the method comprising:
forming a groove in a seal body of the seal, wherein the groove has a first side wall, a second side wall;
forming a plurality of honeycomb cells in the seal body; and
providing a plurality of vanes within the groove, each of the plurality of vanes extending axially between the first and second side walls of the at least one groove.

10. The seal of claim 1 wherein both the first and second side walls of the at least one groove are separated from the plurality of honeycomb cells by a margin area.

* * * * *